United States Patent
'T Zand et al.

(10) Patent No.: US 12,075,795 B2
(45) Date of Patent: Sep. 3, 2024

(54) FAT COMPOSITION

(71) Applicant: Bunge Loders Croklaan B.V., Wormerveer (NL)

(72) Inventors: Imro 'T Zand, Pasir Gudang (MY); Raja Norosmawati, Pasir Gudang (MY); Chin Woon Ho, Pasir Gudang (MY); Vivian Tham, Pasir Gudang (MY)

(73) Assignee: BUNGE LODERS CROKLAAN B.V., Wormerveer (NL)

( * ) Notice: Subject to any disclaimer, the term of this patent is extended or adjusted under 35 U.S.C. 154(b) by 637 days.

(21) Appl. No.: 16/480,838

(22) PCT Filed: Jan. 29, 2018

(86) PCT No.: PCT/EP2018/052128
§ 371 (c)(1),
(2) Date: Jul. 25, 2019

(87) PCT Pub. No.: WO2018/138335
PCT Pub. Date: Aug. 2, 2018

(65) Prior Publication Data
US 2021/0127702 A1    May 6, 2021

(30) Foreign Application Priority Data

Jan. 30, 2017 (EP) .................... 17275012

(51) Int. Cl.
*A23G 1/38* (2006.01)
*A23D 9/02* (2006.01)

(52) U.S. Cl.
CPC .............. *A23G 1/38* (2013.01); *A23D 9/02* (2013.01); *A23V 2002/00* (2013.01)

(58) Field of Classification Search
None
See application file for complete search history.

(56) References Cited

U.S. PATENT DOCUMENTS

| | | | | |
|---|---|---|---|---|
| 4,199,611 | A | * | 4/1980 | Toyoshima et al. ..... A23D 5/00 426/607 |
| 4,276,322 | A | | 6/1981 | Padley et al. |
| 4,873,109 | A | | 10/1989 | Tanaka et al. |
| 2008/0089995 | A1 | | 4/2008 | Okochi et al. |
| 2010/0104731 | A2 | | 4/2010 | Ueyama et al. |

(Continued)

FOREIGN PATENT DOCUMENTS

| CA | 2823524 A1 | * | 8/2012 | ............ A23D 7/003 |
|---|---|---|---|---|
| EP | 0034065 A2 | | 8/1981 | |

(Continued)

OTHER PUBLICATIONS

Anderson et al. (EP 3079486) (Year: 2016).*

(Continued)

*Primary Examiner* — Felicia C Turner
(74) *Attorney, Agent, or Firm* — Morgan, Lewis & Bockius LLP

(57) ABSTRACT

A fat composition comprises:
from 55 to 75% StOSt;
from 10 to 25% POSt; and
less than 10% POP;
said percentages being by weight based on total triglycerides present in the composition, and has the following N-values:
N35 of less than 45; and
N10 of greater than 80.

6 Claims, 2 Drawing Sheets

Figure 1:
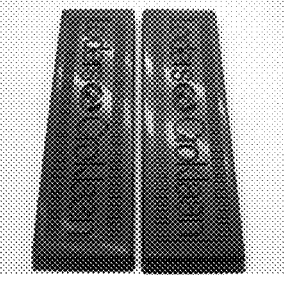
Figure 1:
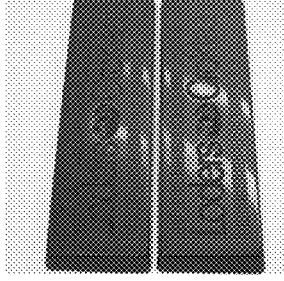
Figure 1:
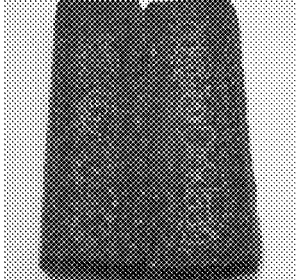
Figure 1:
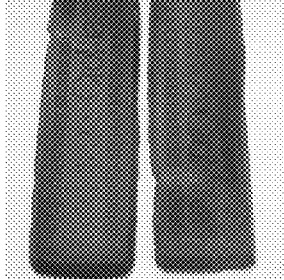

| | Recipe 1 | Recipe 2 |
|---|---|---|
| Before cycle test | | |
| | Glossy | Glossy |
| After cycle 1 | | |
| | De-tempered and deformed | De-tempered and deformed |

(56) References Cited

U.S. PATENT DOCUMENTS

| | | |
|---|---|---|
| 2013/0323397 A1 | 12/2013 | Akahane et al. |
| 2016/0309734 A1 | 10/2016 | Andersen |

FOREIGN PATENT DOCUMENTS

| | | | | |
|---|---|---|---|---|
| EP | 0130487 A2 * | 1/1985 | ............... | A23D 5/02 |
| EP | 0196210 A2 * | 1/1986 | ............... | A23D 5/00 |
| EP | 1776870 A1 | 4/2007 | | |
| EP | 2319329 A1 | 5/2011 | | |
| JP | S53-115863 A | 10/1978 | | |
| JP | S56-058-444 A | 5/1981 | | |
| JP | S61-219338 A | 9/1986 | | |
| JP | 2004-298041 A | 10/2004 | | |
| JP | 2008-154555 A | 7/2008 | | |
| JP | 2010-022310 A | 2/2010 | | |
| WO | 2006/080418 A1 | 8/2006 | | |
| WO | 2008/035968 A2 | 3/2008 | | |
| WO | 2012/114914 A1 | 8/2012 | | |

OTHER PUBLICATIONS

Liesbeth Depoortere "The use and applicability of Cocoa butter equivalents in chocolate products" (Year: 2011).*

Liesbeth Depoortere "The use and applicability of Cocoa butter equivalents in chocolate products" (Year: 2011) (Year: 2011).*

International Preliminary Report on Patentability issued in corresponding International Patent Application No. PCT/EP2018/052128 dated Jul. 30, 2019.

Extended European Search Report issued in corresponding European Patent Application No. 17275012.7 dated Mar. 30, 2017.

International Search Report issued in corresponding International Patent Application No. PCT/EP2018/052128 dated Mar. 12, 2018.

Written Opinion issued in corresponding International Patent Application No. PCT/EP2018/052128 dated Mar. 12, 2018.

I. Hachiya, "Crystallization of Fats in Chocolate Governs Quality," Journal of the Crystallographic Society of Japan, 2001, vol. 43, pp. 315-322 (partial English translation).

Third Party Observations filed in Japanese Patent Application No. 2019-540034 dated Sep. 9, 2021 (with English translation).

Hachiya, "Crystallization of Fats in Chocolate Governs Quality," Journal of the Crystallographic Society of Japan, 43:315-322 (2001) (see English abstract).

Third Party Observations issued in corresponding Japanese Patent Application No. 2019-50034 dated Sep. 9, 2021.

Third Party Observations filed in European Patent Application No. 18701756.1 dated May 19, 2021.

Talbot et al., "Fats for confectionery coatings and fillings," Chapter 4: 53-79, Technology of coated and filled chocolate, confectionery and bakery products, Talbot, ed. (2009).

Gunstone et al., "Lipid Glossary 2" (2000).

Rees, "Chocolate vs. Cocoa Powder," https://www.finecooking.com/article/chocolate-vs-cocoa-powder (Fine Cooking, Issue 89, 2007).

Kochhar, "Minor and Speciality Oils," taken from "Vegetable Oils in Food Technology: Composition, Properties and Uses", Second Edition, 322-324 (2011).

Jun Jin et al., "Production of High-Melting Symmetrical Monounsaturated Triacylglycerol-Rich Fats from Mango Kernal Fat by Acetone Fractionation", J Am Oil Chem Soc (2017) 94:201-213.

Ray et al., "Characterisation of high 1,3-distearoyl-2-oleoyl-sn-glycerol content stearins produced by acidolysis of high pleic sunflower oil with stearic and palmitic acids", European Journal of Lipid Science and Technology 2014, vol. 116, p. 532-547.

The Lipid Handbook 3rd edition, Gunstone et al., 2007.

Advanced Dairy Chemistry, vol. 2: Lipids, Fourth Edition, McSweeney et al., 2020.

Industrial Chocolate Manufacture and Use, Fourth Edition, S. T. Beckett, 2009.

Kyoung Kyu Kang et al., "Cocoa Butter Equivalents Prepared by Blending Fractionated Palm Stearin and Shea Stearin", Food Sci. Biotechnol. 22(2): 347-352 (2013).

Nathalie De Clercq et al., "Functionality of cocoa butter equivalents in chocolate products", Eur Food Res Technol (2017) 243:309-321.

B. Hernandez et al., "Triglyceride Analysis of Cocoa Beans from Different Geographical Origins", Food Chemistry 41 (1991), 269-276.

AAK Experimental Report concerning Shea Stearin and Illipe Butter.

Notice of Opposition by AAK against EP3573468.

Torbica et al., "The advantages of solid fat content determination in cocoa butter and cocoa butter equivalents by the Karlshamns method", 2005, Eur. Food Res. Technol., 222, p. 385-391.

"AAK Experimental Report", 5 pages total.

Rule 116 Submissions by AAK issued May 17, 2024 for European Patent No. 3573468.

* cited by examiner

| | Recipe 1 | Recipe 2 |
|---|---|---|
| Before cycle test |  |  |
| | Glossy | Glossy |
| After cycle 1 |  |  |
| | De-tempered and deformed | De-tempered and deformed |
| | | |

| Recipe 3 | Recipe 4 | Recipe 5 |
|---|---|---|
|  |  |  |
| Glossy | Glossy | Glossy |
|  |  |  |
| Slightly deformed | Slightly deformed and deformed | Retain shape and not bloomed |
|  |  |  |
| Deformed and bloomed | Deformed and bloomed | Not deformed but slightly bloomed |
| | |  |
| | | Not deformed but severely bloomed |

FAT COMPOSITION

This invention relates to a fat composition, to uses of the composition, and to confectionery products comprising the composition.

Triglyceride fats such as cocoa butter are used extensively in the confectionery industry. For example, chocolate contains cocoa butter as the main or sole triglyceride fat. There is also a market for chocolate-like products in which the cocoa butter is partly or completely replaced by other triglyceride fats. These chocolate-like products are sometimes known as compound products.

Cocoa butter equivalents (CBEs) and cocoa butter improvers (CBIs) are fat compositions that can be used in combination with cocoa butter in confectionery applications. Suitable fats which can be used to produce CBEs and CB's are palm oil, illipé butter, sal fat, shea butter, kokum and mango kernel fat. CBEs are often fractionated forms of these fats that have a triglyceride composition that is closer to that of cocoa butter. CB's are cocoa butter alternatives having an increased heat resistance and are generally added in a relatively small amount compared to the amount of cocoa butter that is present.

EP-A-1776870 discloses shea based CB's mixed with palm or shea based CBEs in order to increase resistance to elevated temperature. The CBI is present in a relatively large amount compared to the CBE.

U.S. Pat. No. 4,276,322 discloses fat blends for chocolate which are based on SOS/POS fats, preferably prepared synthetically, used in combination with a high POP fat such as palm mid-fraction. A number of blends are disclosed which can be used as a hard fat in chocolate.

EP-A-2068640 relates to coating or filling compositions containing lauric fats such as palm kernel oil and having a lauric acid (C12 fatty acid) content of 30-56% by weight. The compositions contain only 1-7% by weight stearic acid.

There remains a need for cocoa butter improvers (CBIs) which can provide increased heat resistance, particularly under tropical conditions. There is also a need for such compositions that can be prepared relatively easily from available materials. Further, there is a need for such compositions that can reduce or inhibit shape deformation and blooming in confectionery products such as chocolate and chocolate-like products due to elevated temperatures.

According to the invention, there is provided a fat composition comprising:
from 55 to 75% StOSt;
from 10 to 25% POSt; and
less than 10% POP;
said percentages being by weight based on total triglycerides present in the composition, and having the following N-values:
N35 of less than 45; and
N10 of greater than 80.

In another aspect, the invention provides a process for making the fat composition of the invention which comprises mixing from 60 to 80% by weight shea stearin with from 20 to 40% by weight illipe butter.

Also provided by the invention is the use of a fat composition of the invention as a cocoa butter improver (CBI).

Further provided by the invention is the use of a fat composition of the invention for increasing the heat resistance of a fat-containing confectionery product.

The invention also provides the use of a fat composition of the invention for decreasing blooming of a fat-containing confectionery product.

Another aspect of the invention is a confectionery product comprising from 10 to 90% by weight fat, wherein the fat comprises:
from 30 to 55% by weight StOSt;
from 20 to 40% by weight POSt; and
from 5 to 30% by weight POP,
said percentages being based on the weight of the fat.

It has surprisingly been found that the fat composition exhibits improved properties when used as a CBI. In particular, the fat composition can improve the heat resistance of a fat-containing confectionery product such as a chocolate or a chocolate-like product. For example, the confectionery product may exhibit heat resistance when heated to temperatures in the range of from 25 to 37° C.

The fat composition of the invention preferably comprises:
from 60 to 70% StOSt;
from 11 to 20% POSt; and
from 1 to 9% POP;
said percentages being by weight based on total triglycerides present in the composition. The fat composition will typically contain at least 90% by weight triglycerides, preferably at least 95% by weight triglycerides. Minor amounts of mono- and/or di-glycerides may be present in the fat composition.

The terms StOSt, POSt and POP take their normal meaning in the art and refer to the triglycerides 1,3-distearoyl-2-oleoylglycerol, 1-palmitoyl-2-oleoyl-3-stearoylglycerol and 1,3-dipalmitoyl-2-oleoylglycerol, respectively.

Preferably, the StOSt content of the fat composition is from 60 to 70% by weight, even more preferably from 62 to 68% by weight, based on total triglycerides present in the composition.

Preferably, the fat composition has a POSt content of from 11 to 16% by weight based on total triglycerides present in the composition.

Preferably, the fat composition comprises less than 8% by weight POP based on total triglycerides present in the composition, such as from 1 to 7% by weight POP, for example from 2 to 6% by weight POP based on total triglycerides present in the composition.

The fat composition of the invention may comprise shea stearin and illipe butter. Preferably, the fat composition comprises from 60 to 80% by weight shea stearin and from 20 to 40% by weight illipe butter, more preferably from 65 to 75% by weight shea stearin and from 25 to 35% by weight illipe butter. The fat composition may optionally comprise one or more other fats or oils in addition the shea stearin and illipe butter, for example in an amount of up to 10% by weight of the composition. Preferably the fat composition consists of shea stearin and illipe butter i.e., without other added fats or oils.

The fat composition of the invention preferably comprises from 1 to 10% by weight palmitic acid based on C12 to C24 fatty acids present in the fat composition. Most if not all of the palmitic acid is present in covalently bonded form in glycerides (i.e., triglycerides and any mono- and di-glycerides that might be present).

The fat composition of the invention preferably comprises from 45 to 75% by weight stearic acid based on C12 to C24 fatty acids present in the fat composition. Most if not all of the stearic acid is present in covalently bonded form in glycerides (i.e., triglycerides and any mono- and di-glycerides that might be present).

The fat composition of the invention preferably comprises from 25 to 35% by weight oleic acid based on C12 to C24 fatty acids present in the fat composition. Most if not all of the oleic acid is present in covalently bonded form in glycerides (i.e., triglycerides and any mono- and di-glycerides that might be present).

The fat composition of the invention preferably comprises less than 5% by weight, more preferably less than 3% by weight, such as less than 1% by weight, of lauric acid based on C12 to C24 fatty acids present in the fat composition. Any lauric acid is typically present in covalently bonded form in glycerides (i.e., triglycerides and any mono- and di-glycerides that might be present).

The levels of fatty acids present in the compositions of the invention can be determined by methods well-known to those skilled in the art such as using fatty acid methyl ester analysis (FAME) gas chromatography for example according to ISO 15304.

The term "fatty acid", as used herein, refers to straight chain saturated or unsaturated (including mono- and polyunsaturated) carboxylic acids having from 12 to 24 carbon atoms. A fatty acid having n carbon atoms and x double bonds may be denoted Cn:x. For example, palmitic acid may be denoted C16:0 and oleic acid may be denoted C18:1. Percentages of fatty acids in compositions referred to herein include acyl groups in tri-, di- and mono-glycerides present in the glycerides as is customary terminology in the art.

The fat composition of the invention has the following N-values:
N35 of less than 45, preferably less than 30, even more preferably less than 25; and
N10 of greater than 80, preferably greater than 85.

The term Nx used herein refers to solid fat content at a temperature of x° C., measured by NMR pulse techniques carried out on fat stabilized at 26° C. A method for determining N values is the IUPAC 2.150a method.

The fat composition preferably has an N25 of greater than 50, more preferably greater than 60, such as greater than 70. The N20 of the fat composition is preferably greater than 80. N30 is preferably greater than 60. N40 is preferably less than 10, more preferably less than 5.

A particularly preferred fat composition of the invention comprises:
From 50 to 60% StOSt;
from 11 to 15% POSt; and
from 2 to 7% POP;
said percentages being by weight based on total triglycerides present in the composition, and having the following N-values:
N40 of less than 10;
N35 of less than 30;
N30 of greater than 60;
N25 of greater than 70; and
N10 of greater than 80.

The fat composition of the invention is preferably of vegetable origin. Fats of vegetable origin are obtained directly or indirectly from vegetable sources. The vegetable fats are preferably refined. The term "refined", as used herein, refers to processes in which the purity of a fat is increased by a process which comprises at least the steps of bleaching, followed by filtering and deodorising (such as by steam refining). The fats are typically not hydrogenated.

Since vegetable fats do not contain significant amounts of cholesterol, the fat compositions and fat blends of the invention preferably contain less than 1%, more preferably less than 0.5%, by weight of cholesterol.

Also, since non-hydrogenated vegetable fats do not contain significant amounts of trans-fats, the fat compositions and fat blends of the invention preferably contain less than 1%, more preferably less than 0.5%, by weight of trans fatty acids.

The confectionery product of the invention comprises from 10 to 90% by weight fat, wherein the fat comprises:
from 30 to 55% by weight StOSt;
from 20 to 40% by weight POSt; and
from 5 to 30% by weight POP,
said percentages being based on the weight of the fat in the product.

A preferred confectionery product of the invention comprises from 10 to 90% by weight fat, wherein the fat comprises:
from 35 to 50% by weight StOSt;
from 25 to 35% by weight POSt; and
from 8 to 28% by weight POP,
said percentages being based on the weight of the fat.

A more preferred confectionery product of the invention comprises from 10 to 90% by weight fat, wherein the fat comprises:
from 35 to 40% by weight StOSt;
from 30 to 35% by weight POSt; and
from 20 to 30% by weight POP,
said percentages being based on the weight of the fat.

The confectionery product preferably comprises the fat composition of the invention.

Preferably, the confectionery product of the invention comprises cocoa butter.

More preferably, the confectionery product comprises cocoa butter and the fat composition of the invention in a weight ratio of cocoa butter:fat composition of from 3:2 to 4:1, even more preferably from 2:1 to 3:1.

The confectionery product produced according to the invention is typically chocolate or a chocolate-like product (i.e., a product that resembles chocolate but contains fats that replace some or all of the cocoa butter compared to a chocolate containing cocoa butter as the sole fat) and may, for example, be selected from bars and confectionery coatings.

The confectionery products will preferably comprise one or more further ingredients such as sugar (more preferably sucrose), skimmed milk powder, cocoa butter, and emulsifier (e.g., lecithin, PGPR, sorbitan tristearate or a mixture thereof). Further optional components include flavouring (e.g., vanillin, mint, orange, etc) and inclusions such as confectionery and fruit pieces.

The confectionery product of the invention preferably comprises one or more ingredients selected from cocoa powder, sugar and lecithin.

Preferably, the chocolate-like confectionery product comprises from 30 to 70% by weight sucrose and from 0.1 to 1% by weight lecithin together with the fat composition of the invention and cocoa-derived materials including cocoa butter.

Coatings may be applied to a confectionery or bakery product. The term "bakery products", as used herein, refers to products that are typically produced or sold in a bakery and which have preferably been baked or fried, although they can be produced in other ways. The coating can be partial or complete and, when the coating is complete, the composition will encapsulate the bakery product. The bakery products are preferably made using flour. Examples of bakery products are donuts, cakes, biscuits, pastries and cookies. Donuts optionally contain jam or jelly.

Coated bakery products can be produced by heating the composition to around or above the melting point of the composition (e.g., above 35° C.), applying the composition to an uncoated bakery product (e.g., by pouring the composition onto the uncoated bakery product or by immersing the uncoated bakery product in the composition) and lowering the temperature to below the melting point of the composition by allowing it to cool (or by forced cooling). Suitable methods are well-known to those skilled in the art.

The coated bakery products may be further decorated with ingredients that adhere to the coating of the composition such as icing and/or chocolate strands or chips or sugar strands (which can be of a single colour or multi-coloured).

Confectionery products may also be coated with a composition of the invention. Suitable confectionery products include chocolates, chocolate-like products and jellies.

Preferences and options for a given aspect, embodiment, feature or parameter of the invention should, unless the context indicates otherwise, be regarded as having been disclosed in combination with any and all preferences and options for all other aspects, embodiments, features and parameters of the invention. For example, the preferred features of the fat composition may be applied when the fat composition is used in the confectionery product.

The listing or discussion of an apparently prior-published document in this specification should not necessarily be taken as an acknowledgement that the document is part of the state of the art or is common general knowledge.

The following non-limiting examples illustrate the invention and do not limit its scope in any way. In the examples and throughout this specification, all percentages, parts and ratios are by weight unless indicated otherwise.

EXAMPLES

Figure 2:
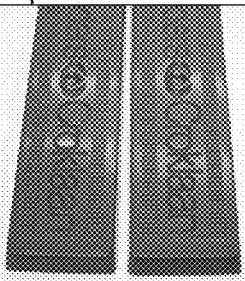
Figure 2:
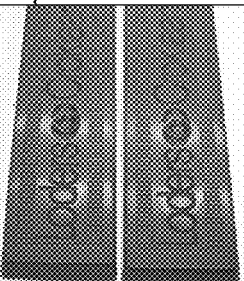
Figure 2:
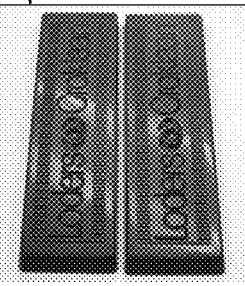
Figure 2:
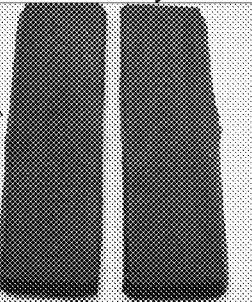
Figure 2:
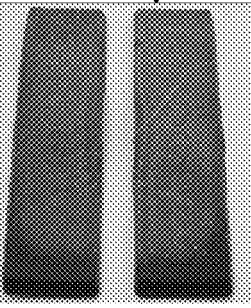
Figure 2:
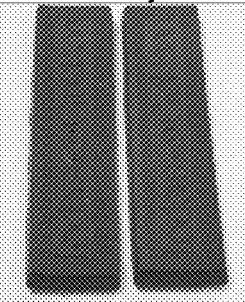
Figure 2:
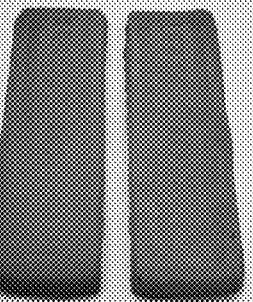
Figure 2:
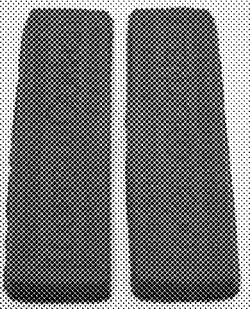
Figure 2:
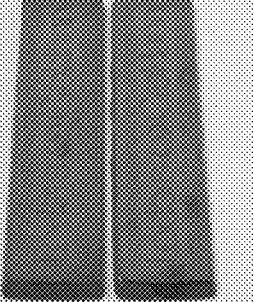
Figure 2:
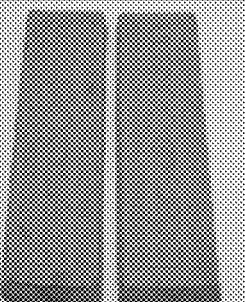

The examples include reference to the figures in which:

FIGS. 1 and 2 show the results of tests on the ability of confectionery products comprising a fat composition of the invention to retain shape and resist blooming.

EXAMPLE 1

Fat blends as provided in Table 1a were prepared, wherein PMF is palm mid fraction and SHs is shea stearin fraction containing 75% StOSt, 7% POSt and 2% POP.

TABLE 1a

|  | Fat blend 1 (comparative) | Fat blend 2 |
|---|---|---|
| PMF | 55 |  |
| SHs | 45 | 70 |
| Illipé butter |  | 30 |
| Iodine value (IV) | 34.4 | 32.5 |
| Slip Melting Point, ° C. | 32.6 | 34.5 |
| N-value - SFC stabilized at 26° C. |  |  |
| S26N10 |  | 92 |
| S26N20 | 72 | 86 |
| S26N25 | 63 | 83 |
| S26N30 | 51 | 72 |
| S26N35 | 7 | 21 |
| S26N40 | 0 | 2 |
| Fatty acid composition |  |  |
| C12:0 | 0.08 | 0.0 |
| C14:0 | 0.55 | 0.0 |
| C16:0 | 33.01 | 6.4 |
| C18:0 | 28.93 | 57.7 |
| C18:1(t) | 0.07 | 0.1 |
| C18:1c | 32.33 | 31.5 |
| C18:2(t) | 0.15 | 0.0 |
| C18:2c | 2.82 | 2.0 |
| C18:3c | 0.05 | 0.1 |
| C20:0 | 1.44 | 1.9 |

TABLE 1a-continued

The following table (Table 1b) shows the StOSt, POSt and POP content of illipe butter, the shea stearin (SHs) and cocoa butter (CB) as well as of the blend according to the invention.

TABLE 1b

|  | StOSt | POSt | POP |
|---|---|---|---|
| SHs | 75 | 7 | 2 |
| Illipe | 42 | 29 | 9 |
| CB | 26 | 40 | 17 |
| 70SHs/30illipe | 65.1 | 13.6 | 4.1 |
| 70% fat (70 SHs + 30 Illipe) + 30 CB | 53.4 | 21.5 | 8.0 |

EXAMPLE 2

Ingredients were blended according to Table 2.

TABLE 2

| In % by weight | Recipe 1 With Fat blend 1 | Recipe 2 with Fat blend 2 | Recipe 3 with Fat blend 2 | Recipe 4 with Fat blend 2 | Recipe 5 with Fat blend 2 |
|---|---|---|---|---|---|
| Fat blend | 15 | 5 | 23 | 16.7 | 10 |
| Cocoa Mass | 40 | 36 | 17 | 30.3 | 36 |
| Natural Cocoa Powder |  |  | 10 | 3 |  |
| Cocoa Butter (CB) |  | 9 |  |  | 4 |
| Sugar | 45 | 49.6 |  |  | 49.6 |
| Lecithin | 0.2 | 0.4 |  |  | 0.4 |
| Vanillin | 0.02 | 0.02 |  |  | 0.02 |
| Final fat blend in % by weight | 60CCB/ 40 fat blend 1 | 85CCB/ 15 fat blend 2 | 30CCB/ 70 fat blend 2 | 50CCB/ 50 fat blend | 70CCB/ 30 fat blend |
| StOSt | — | 31.9 | 53.4 | 45.6 | 37.7 |
| POSt | — | 36.0 | 21.5 | 26.8 | 32.1 |
| POP | — | 15.1 | 8.0 | 10.6 | 13.1 |

EXAMPLE 3—TEMPERING

The test involves cycling the chocolate products from Example 2 up to an elevated temperature and then back down to ambient (25° C.).

Test 1: 5 Cycles

Cycle 1 heat at 37° C.; hold for 8 hours; reduce to 20° C. and hold for 16 hours Repeat 4 times and finally hold ambient temperature and time to bloom measured.

TABLE 3

| Samples | Temper temperature, ° C. | Observation during temper |
|---|---|---|
| Recipe 1 | 26.0-28.0 | Normal |
| Recipe 2 | 25.8-28.6 | Normal |
| Recipe 3 | 26.0-29.6 | Normal |

TABLE 3-continued

| Samples | Temper temperature, ° C. | Observation during temper |
|---|---|---|
| Recipe 4 | 26.6-29.2 | Normal |
| Recipe 5 | 27.6-30.8 | Normal |

FIGS. 1 and 2 show the results of the tests. The figures show that the recipes increased in their ability to retain shape and resist blooming in the order 1<2<3<4<5.

The invention claimed is:

1. A fat composition which has a stearic acid content of from 45 to 75% by weight and an oleic acid content of from 25 to 35% by weight based on C12 to C24 fatty acids present in the fat composition, comprising:
   from 60 to 80% by weight shea stearin; and
   from 20 to 40% by weight illipe butter;
   from 62 to 68% StOSt;
   from 11 to 16% POSt; and
   from 2 to 6% POP;
the percentages of StOSt, POSt and POP being by weight based on total triglycerides present in the composition, and having the following N-values:
   N30 of greater than 60;
   N35 of less than 30; and
   N10 of greater than 80.

2. The fat composition as claimed in claim 1, which has an N25 of greater than 50.

3. The fat composition as claimed in claim 1, which has a palmitic acid content of from 1 to 10% by weight based on C12 to C24 fatty acids present in the fat composition.

4. A cocoa butter improver comprising the fat composition according to claim 1, the fat composition having a stearic acid content of from 45 to 75% by weight and an oleic acid content of from 25 to 35% by weight based on C12 to C24 fatty acids present in the fat composition, comprising:
   from 60 to 80% by weight shea stearin;
   and from 20 to 40% by weight illipe butter;
   from 62 to 68% StOSt;
   from 11 to 16% POSt;
   and from 2 to 6% POP;
   the percentages of StOSt, POSt and POP being by weight based on total triglycerides present in the composition,
   and having the following N-values:
   N30 of greater than 60;
   N35 of less than 30;
   and N10 of greater than 80.

5. The fat composition as claimed in claim 1, which has an N35 of less than 25.

6. The fat composition as claimed in claim 1, which comprises less than 5% by weight of lauric acid, based on C12 to C24 fatty acids present in the fat composition.

* * * * *